(12) United States Patent
Audibert et al.

(10) Patent No.: US 6,257,336 B1
(45) Date of Patent: *Jul. 10, 2001

(54) WELL CEMENTING METHOD USING HMHPG FILTRATE REDUCER

(75) Inventors: Annie Audibert, Croissy sur Seine; Jean-François Argillier, Suresnes, both of (FR); Ugo Pfeiffer, Milan; Guiseppe Molteni, Varese, both of (IT)

(73) Assignees: Institut Francais du Petrole, Rueil Malmaison Cedex (FR); Societe Lamberti SpA, Albizzate (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,611

(22) PCT Filed: Apr. 17, 1997

(86) PCT No.: PCT/FR97/00697

§ 371 Date: Mar. 31, 1998

§ 102(e) Date: Mar. 31, 1998

(87) PCT Pub. No.: WO97/38951

PCT Pub. Date: Oct. 23, 1997

(30) Foreign Application Priority Data

Apr. 18, 1996 (FR) .................................................. 96/04990

(51) Int. Cl.[7] .............................. E21B 33/13; C04B 28/08
(52) U.S. Cl. .......................... 166/293; 166/283; 106/823; 106/730
(58) Field of Search ................................... 166/293, 283; 106/730, 790, 805, 823

(56) References Cited

U.S. PATENT DOCUMENTS

| | | | |
|---|---|---|---|
| 3,483,121 | * 12/1969 | Jordan | 507/217 |
| 3,740,360 | 6/1973 | Nimerick | 260/17.4 |
| 3,766,984 | * 10/1973 | Nimerick | 166/294 |
| 4,676,317 | * 6/1987 | Fry et al. | 166/293 |
| 4,870,167 | * 9/1989 | Zody et al. | 536/114 |
| 4,960,876 | * 10/1990 | Molteni et al. | 536/114 |
| 4,997,487 | * 3/1991 | Vinson et al. | 106/804 |
| 5,184,680 | * 2/1993 | Totten et al. | 166/293 |
| 5,233,032 | 8/1993 | Zody et al. | 536/114 |
| 5,720,347 | * 2/1998 | Audibert et al. | 166/294 |

FOREIGN PATENT DOCUMENTS

| | | |
|---|---|---|
| 281360 | 9/1988 | (EP) . |
| 290198 | 11/1988 | (EP) . |
| 722036 | 7/1996 | (EP) . |

OTHER PUBLICATIONS

Mark, H. and Kroschwitz, J.; Encyclopedia of Polymer Science and Engineering vol. 3, pp. 235–237,578,579; 1985.*

* cited by examiner

*Primary Examiner*—David Bagnell
*Assistant Examiner*—John Kreck
(74) *Attorney, Agent, or Firm*—Mille, White, Zelano & Branigan, P.C.

(57) ABSTRACT

For controlling filtration loss during the installation of climber cement in a well, the procedure entails the addition of a specific quantity of at least one derivative of galactomannan, hydrophilically and hydrophobically modified, a hydrophobically modified hydroxy propyl guar (HMHPG).

11 Claims, No Drawings

WELL CEMENTING METHOD USING HMHPG FILTRATE REDUCER

FIELD OF THE INVENTION

The present invention relates in particular to operations conducted as a means of exploiting subsoil deposits containing hydrocarbons. More specifically, the invention describes a method of controlling fluid loss by filtration in a geological formation when cementing a well with clinker.

BACKGROUND OF THE INVENTION

When a clinker cement is placed in contact with a porous geological formation, an aqueous element of the clinker tends to penetrate the pores of the formation. This is generally referred to as filtration. This quantity which is lost from the clinker compound is referred to as filtration loss or filtrate. It is desirable to limit this loss, particularly of water, from a clinker, since any such loss will alter its physical-chemical properties, for example its rheological properties. The characteristic which allows it to be pumped may be seriously affected or its setting capacity might be altered due to a decrease in the amount of water needed to bring about the various chemical reactions causing it to set and these factors are clearly detrimental to the cementing operation in the well as well as to the mechanical properties of the cement once it has set. This filtration through a porous formation also incurs the risk of destabilising the walls of the well or clogging geological production or potential production zones. Additives specific to clinker cements which act as filtrate reducers, are therefore incorporated with the clinker cements as a means of restricting filtration, for example by reducing the filtration speed, especially by reducing the permeability of the cake formed on the well walls.

Clearly, these filtrate reducer products used with clinker cement will depend on the composition of the clinker in terms of how high the solid content is and in view of the fact that the clinker by definition undergoes a physical-chemical change along the formation during the setting process. In addition, it is desirable that the cake formed due to filtration will do virtually nothing to damage the mechanical bond of the cement with the wall of the well.

Numerous filtrate reducer products for clinker cements are known in the profession. Finely divided mineral particles may be used, for example, or water-soluble polymers such as the sulphonated derivatives of polyacrylamide or HEC (hydroxyethyl cellulose). However, the polymers used in the profession are very sensitive to the high temperatures which can be encountered at subsoil level, and thus lose their initial properties.

SUMMARY OF THE INVENTION

The present invention therefore relates to a method implemented in a bore drilled through at least one geological formation of a certain permeability, whereby a clinker cement is moved through said well. During the method, filtration through the walls of said well is limited as the clinker is being cemented by adding a given quantity of at least one derivative of a hydrophilically and hydrophobically modified galactomannan.

In one embodiment, the derivative is hydrophobically modified hydroxy propylated guar.

The hydrophilically modified galactomannan may be hydrophobically modified by fixing, on the oxygens, radicals having the general formula (1):

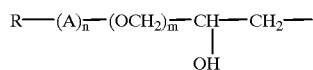

where
A=a linear or branched oxyalkylenic O—$C_pH_{2p}$ group where p is 2 to 4, n=0 to 30; m=0 or 1 where m may not be zero unless n is zero,
R=a linear or branched (hydrophobic) alkyl radical, which may or may not be ethylenically saturated, having between 10 and 32 carbon atoms, preferably between 12 and 30 and more particularly between 18 and 28.

The molecular mass of the modified galactomannan may be less than 2000000 dalton and preferably within the range of between 50000 and 1600000 dalton.

The clinker may include other polymers of the polysaccharide type or synthetic polymer selected from the group comprising scleroglucan, derivatives of the hydroxy ethylated cellulose type (HEC), CMC, Guar gum and the derivatives of polyacrylamide.

The invention also relates to a clinker cement to be applied in a well bored through at least one geological formation of a certain permeability, the clinker containing a given quantity of at least one derivative of a hydrophilically and hydrophobically modified galactomannan.

The filtrate of this clinker may be controlled by adding a given quantity of at least one derivative of hydrophilically and hydrophobically modified glactomannan.

In one embodiment, the derivative may be hydrophobically modified hydroxy propylated guar.

The viscosity of the clinker may be essentially controlled by adding at least one polymer selected from the group comprising xanthane, scleroglucan, wellane, hydroxy ethylated cellulose (HEC), CMC, gum of guar and the polyacrylamides or their derivatives.

The invention also relates to a filtrate reducing additive for clinker cement, the additive containing a given quantity of at least one derivative of hydrophilically and hydrophobically modified galactomannan.

Galactomannans are polysaccharides essentially consisting of galactose and mannose units. They are produced from the endosperm of leguminous seeds such as guar, carob and suchlike.

In particular, guar gum is a natural polymer made up of monomeric units of D-mannose linked to one another by 1-4 bonds forming the main chain on which units of D-galactose are branched by 1-6 bonds. This derivative is functionalised to render it hydrophilic by reaction with an alkylene oxide of 2 to 4 carbon atoms or by reaction in the presence of monochloroacetic acid. The hydrophilic substituents are selected from the group comprising hydroxethyl, hydroxypropyl, hydroxybutyl, carboxymethyl. This derivative is functionalised to render it hydrophobic by reaction with an epoxyalkane and/or alkene, or alkyl and/or alkenyl glycidyl ether in a basic medium, by means of the method described in document U.S. Pat. No. 4,960,876, for example, whereby from 0.001 t 2% of functions (1) can be grafted.

The products obtained thereby (HM guar) can be used as they are or purified by a process of extraction in organic solvents or in a mixture of water and organic solvent in order to remove certain impurities.

Water-soluble HM guar can be prepared from a derivative of guar gum by chemically incorporating a long chain corresponding to the radical given in formula (1).

The hydrophobic functions are grafted onto the hydrophilic chain by functions of the type

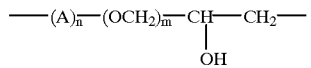

where A=a linear or branched oxyalkylenic O—$C_pH_{2p}$ group where p is 2 to 4, n=0 to 30; m=0 or 1 where m may not be zero unless n is zero, These functions of the "spacer" type enable the hydrophobic groups to be separated from the main chain.

The number of hydrophobic units varies from 0.00001 to approximately 0.02 substituents per unit of anhydroglucoside, preferably between 0.00005 and 0.01 and is more especially efficient between 0.0001 and 0.001 substituents per unit of anhydroglucoside.

The HM guar polymer may have a molar substitution rate per hydrophilic unit of 0.7 and preferably between 0.7 and 4, the molar ratio between the hydrophilic and hydrophobic substituents being within the range between 35/1 and 400000/1. The hydrophilic unit may be of the hydroxyethyl, hydroxypropyl, hydroxybutyl type or a carboxylated substituent. The hydrophobic unit may be of the alkyl, linear or branched alkylenyl type having from 10 to 32 carbon atoms. The hydrophobically modified hydroxy propylated guar is referred to here as HMHPG.

The efficiency of the polymers used for the purposes of the present invention exhibit at least an improvement as a means of controlling filtration as compared with the known synthetic acrylic polymers in particular. In addition, however, the polymers of the invention are natural products and have the specific advantage of being bio-degradable and compatible with the relatively stringent laws governing environmental protection. Compared with the other natural polymers conventionally used, the polymers of the invention exhibit a good capacity to control the filtration of clinker cements.

The applicant has demonstrated that GM guar polymer, as defined above, is efficient as a means of controlling the filtration of a clinker cement, which is a fluid whose liquid phase is aqueous. The clinker circulated in a well or cemented by circulation through a well may include reactive, clay-based viscosifying products and/or polymers of a specific nature to produce a viscosifying function. For certain applications, the clinker may include other mineral fillers, such as silica, silica fumes, barite, etc., for example, as a means of modifying the rheological and physical characteristics of the clinker.

Surprisingly, the polymer of the present invention exhibits a better resistance to high temperatures than the polymers currently used for this application. This means that the polymer of this invention can be used in a much wider range of applications.

A clinker is a fluid which is displaced through a well so that it can fixed in a production well. As it moves or is cemented, this clinker is in contact with the productive or potentially productive geological formation for a shorter or longer period.

The physical and/or chemical characteristics of these clinkers are controlled and adjusted to suit the nature of the geological formation and the effluents present, the downhole conditions and various other roles assumed by such fluids, such as sealing, pressure control, etc. In addition and as far as possible, these fluids must do nothing which will modify the output of the productive geological formation, i.e. they must not irreversibly reduce the permeability of the productive formation. Controlling filtration is an important parameter in all situations.

The HM guar used for the purposes of the present invention exhibits a good capacity for controlling filtration, whether in combination with certain polymers having a viscosifying effect or not, and does so increasingly as the temperature increases. This can not generally be said of the natural polymer derivatives conventionally used as a filtrate reducer in clinker formulae.

The tests described below demonstrate the characteristics of the HM guar under various application conditions and under conventional test procedures. The various clinker cements and their different formulae are described in the publication "Well cementing", Developments in Petroleum Science, 28, ed. E. B. Nelson, Elsevier, 1990. The filtrate reducers conventionally used in clinker cements are HEC (hydroxyethyl cellulose) or sulphonated derivatives of acrylamide, for example. These latter are marketed by Halliburton (USA) under the Halad brand name and are described in U.S. Pat. Nos. 4,557,763 or 4,703,801. API standards (American Petroleum Institute) were rigorously applied during the clinker characterisation tests: API SPEC 10-88, section 5—Preparation of clinker, section 9—Measuring with the consistometer, Appendix F—Filtration. The filtrates are expressed in millilitres (ml) and the setting time in hours.

Various clinker formulae were tested, with or without the addition of retarding agents. The formulation is generally based on a cement of the Class G type mixed with 44% water in accordance with API procedure. The polymer used as a filtrate reducer is hydrated for 16 hours beforehand and then added to the clinker to produce a concentration of 0.325%. The mixture is homogenised in the mixer for 15 s at low speed and then 35 s at high speed. A retarding agent is added to the clinker in a concentration of between 0.2 and 0.6% after measuring the setting time at different temperatures in order to adjust this time to the high temperature tests. The clinker is placed at the requisite temperature with a view to filtration by means of the Halliburton consistometer for 20 minutes.

The formulae of the invention were compared with conventional formulations containing filtrate reducers familiar to those in the profession, such as HEC (hydroxy ethylated cellulose), which can be regarded as one of the best products currently available, hydroxypropyl guar HPG, a precursor of hydrophobically modified hydroxypropyl guar gum, Halad 344 and 100A, polyacrylamide derivatives marketed by Halliburton (USA).

The various derivatives of guar gum used in the tests are hydrophobically modified hydroxy propylated guar HMHPG. The viscosity characteristics η correspond to a Brookfield viscosity (mPa·s) measured at a polymer concentration of 2% at 20 revs./min. The molecular mass of the products was measured by light diffusion at small angles on diluted polymer solutions. Their intrinsic viscosity [η] is calculated from the relative viscosities of weakly concentrated diluted solutions in the presence of KCl 5 g/l, the Huggins constant k' being characteristic of the polymer/polymer interactions:

HPG: hydroxypropyl guar gum of formula (1) where, R-H, n=0 and m=0; η=14000; [η]=1050 cm$^3$/g, k'~0.8, Mw=2.6 10$^6$ dalton.

HMHPG 7: modified guar of formula (1) where R=$C_{18}H_{37}$, n=0, m=1; η=7000; [η]=800 cm$^3$/g, k'~0.8.

HMHPG 8: modified guar of formula (1) where R=$C_{12}H_{25}$, n=0, m=1; η=7800.

HMHPG 9: modified guar of formula (1) where R=$C_{22}H_{45}$, n=0, m=1; η=2000.

HMHPG 10: modified guar of formula (1) where R=$C_{18}H_{37}$, n=0, m=1; η=8000.

HMHPG: modified guar of formula (1) where $R=C_{18}H_{37}$, $n=0$, $m=1$; $\eta=5400$; $[\eta]=950$ cm$^3$/g, $k'\sim 1.5$.

The various modified products tested (HMHPG 7, HMHPG 8, HMHPG 9, HMHPG 10 and HMHPG) have molecular masses ranging between 1.5 and 2 10$^6$ dalton.

Below are other hydrophilically and hydrophobically modified products of the invention:

HMHPG 14: $R=C_{18}H_{37}$, $n=10$, $m=1$, $p=2$, $\eta=500$,

HMHPG 15: $R=C_{16}H_{33}$, $n=0$, $m=0$, $\eta=4300$,

HMHPG 17: $R=C_{22}H_{45}$ to $C_{28}H_{57}$, $n=0$, $m=1$, $\eta=4400$,

HMHPG 18: $R=C_{14}H_{29}$, $n=0$, $m=0$, $\eta=3200$.

It should be noted that in the case of the four products listed above, the viscosity was measured at a 1% polymer concentration.

TEST 1

A comparison of the efficiency of HMHPG with conventional filtrate reducers at different temperatures Conditions : API Standard, Basic formula BF: type G cement, 44% distilled water.

The polymers are metered at 0.325%.

| | Filtrate (cc) 30 min | |
|---|---|---|
| | Temperature | |
| Additive to BF | 86 F. (30° C.) | 140 F. (60° C.) |
| HEC | 32 | 53.5 |
| HPG | 30 | 102 |
| HMHPG | 20.5 | 41 |
| HMHPG/HPG (50/50) | — | 64 |
| Hal 344 | 19 | 35 |
| Hal 100A | — | 155 |

The additives of the Halad type (HAL 344, Hal 100 A) and HEC used are marketed by Halliburton and Aqualon respectively.

COMMENTS

The filtration characteristics in the presence of HMHPG are the same as those of Halad or HEC, which are currently regarded as the best products available.

Using a mixture of HPG/HMHPG products allows the volume of filtrate to be reduced.

TEST 2

Adding a retarding agent to the formulation

Conditions : API Standard,

Base formula BF: G type cement, 44% distilled water.

The polymers are metered at 0.325% and the retarding agent HR 15 at 0.5%.

The setting retarding agents HR15 and HR6 are marketed by Halliburton (USA).

| | Filtrate (cc) 30 min | | |
|---|---|---|---|
| | Temperature | | |
| Additive to BF | 140 F. (60° C.) | 200 F. (93.4° C.) | 230 F. (110° C.) |
| HEC + HR15 | — | >150 | — |
| HMHPG | 41 | 120 | — |
| HMHPG + HR15 | 15 | 54 | >150 |
| Hal 344 | — | 127 | >150 |
| Hal 344 + HR15 | — | >150 | >150 |

Using retarding agent which is a ployacrylate derivative and thus essentially acts as a dispersant will homogenise the clinker and thus probably improve the efficiency of the filtrate reducer product.

The setting times were measured for these different formulae and are set out in the table below:

| | Setting time (h-mn) | |
|---|---|---|
| | Temperature | |
| Additive to BF | 200 F. (93.3° C.) | 230 F. (110° C.) |
| HEC + HR15 | 20 h 10 | 12 h 46 |
| HPG | >23 h 30 | — |
| HMHPG | 1 h 49 | — |
| HMHPG + HR15 | 17 h 34 | 16 h 21 |
| Hal 344 | 1 h 10 | — |
| Hal 344 + HR15 | >17 h | 16 h 46 |

It may be noted from the above measurements that the setting times are too high with this type of retarding agent; in particular, they exceed the requisite time by approximately 5 hours. This can be optimised by optimising the concentration of retarding agent or by selecting the retarding agent. The following results were thus obtained:

| | Setting time (h-mn) | | | |
|---|---|---|---|---|
| | Concentration | | | |
| | 0.25% | 0.3% | 0.4% | 0.5% |
| HMHPG + HR15 | 0 h 55 | 1 h 43 | 12 h 26 | 20 h 10 |
| HMHPG + HR6 | — | — | — | 3 h 34 |

Similarly, at higher temperatures, the formulae must be specifically optimised by adding a mineral filler, which also allows the volume of filtrate to be reduced.

TEST 3

The effect of the hydrophobic chain length

Conditions: API Standard,

Base formula BF: G type cement, 44% distilled water.

The polymers are metered at 0.325% and retarding agent HR6 is metered at 0.5w for the tests at 230F (1100° C.) only.

| Additive to BF | Filtrate (cc) 30 min Temperature | |
|---|---|---|
| | 140 F. (60° C.) | 230 F. (110° C.) (+ HR6) |
| HMHPG | 41 | >150 |
| HMHPG 7 | 70 | 70 |
| HMHPG 8 | 20 | >100 |
| HMHPG 9 | 70 | >150 |
| HMHPG 10 | >100 | >100 |

These tests show that under the conditions of usage, specifically temperature, it is possible to optimise by selecting an appropriate molecular mass and hydrophobic chain length in particular or a specific "spacer".

TEST 4

Conditions: API Standard,
Base formula BF: G type cement, 44% distilled water
The polymers are metered at 0.325% and the retarding agent at 0.2%.

| | Filtrate (cc) at 30 mn Temperature 60° C. | Setting time (h-mn) |
|---|---|---|
| HMHPG | 14 | 3 h 34 |
| HMHPG 18 | 40 | 5 h 10 |

The various tests described above therefore confirm that the clinker formulations can exhibit a good filtration characteristic using an effective quantity of HMHPG as a filtrate reducer. There is reason to think that the specific structure of the GM guar of the present invention is conducive to forming a low permeability cake. In addition, it was noted that the stability of the HM guar structure at different temperatures means that it can be used for those applications of interest to the profession. The advantages and functions of HM guar are to be found in polymers of this class at molecular masses of less than approximately 2000000 dalton.

What is claimed is:

1. In a method comprising circulating a clinker cement in a well bored through at least one geological formation of a certain permeability wherein a filtrate reducer additive is employed to limit filtration through the walls of said well and to limit loss of an aqueous element from the clinker cement, the improvement wherein said filtrate reducer additive comprises a hydrophilically and hydrophobically modified galactomannan substituted, on the oxygens, with both at least one hydrophillic radical and hydrophobic radical, said hydrophobic radical being of the general formula (1):

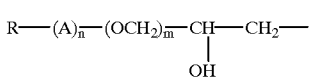

(1)

where
A=a linear or branched oxyalkylenic O—$C_pH_{2p}$ group where p is 2 to 4, n=0 to 30; m=0 or 1 where m may not be zero unless n is zero, R=a linear or branched (hydrophobic) alkyl radical, optionally ethylenically saturated, having between 10 and 32 carbon atoms, the hydrophobic radical being present in a degree of substitution of 0.00001 to 0.0009 hydrophobic units per unit of anhydroglucoside, and wherein the molecular mass of said hydrophobically modified galactomannan is less than 2,000,000 dalton.

2. A method as claimed in claim 1, in which said additive is hydrophobically modified hydroxy propylated guar (HMHPG).

3. A method as claimed in claim 2, in which said clinker also contains at least one polymer selected from the group consisting of xanthane, scleroglucan, wellane, hydroxy ethylated cellulose (HEC), CMC, guar gum and a polyacrylamide.

4. A method as claimed in claim 1 characterised in that R has between 18 and 28 carbon atoms.

5. A method as claimed in claim 1 in which said clinker also contains at least one polymer selected from the group consisting of xanthane, scleroglucan, wellane, hydroxy ethylated cellulose (HEC), CMC, guar gum and a polyacrylamide.

6. A method according to claim 1, wherein the molecular mass of the galactomannan is between 50,000 and 1,600,000.

7. A clinker cement designed to be cemented in a well bored through at least one geological formation of a certain permeability, said clinker cement containing at least one additive, said additive being a hydrophilically and hydrophobically modified galactomannan substituted, on the oxygens, with both at least one hydrophillic radical and hydrophobic radical, said hydrophobic radical being of the general formula (1):

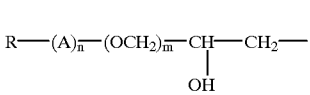

(1)

where
A=a linear or branched oxyalkylenic O—$C_pH_{2p}$ group where p is 2 to 4, n=0 to 30; m=0 or 1 where m may not be zero unless n is zero,
R=a linear or branched (hydrophobic) alkyl radical, optionally ethylenically saturated, having between 10 and 32 carbon atoms, the hydrophobic radical being present in a degree of substitution of 0.00001 to 0.0009 hydrophobic units per unit of anhydroglucoside, and wherein the molecular mass of said hydrophobically modified galactomannan is less than 2,000,000 dalton.

8. A clinker as claimed in claim 7, wherein said additive is hydrophobically modified hydroxy propylated guar (HMHPG).

9. A clinker as claimed in claim 8, said clinker further comprising at least one polymer selected from the group consisting of xanthane, scleroglucan, wellane, hydroxy ethylated cellulose (HEC), CMC, guar gum and a polyacrylamide.

10. A clinker as claimed in claim 7, said clinker further comprising at least one polymer selected from the group consisting of xanthane, scleroglucan, wellane, hydroxy ethylated cellulose (HEC), CMC, guar gum and a polyacrylamide.

11. A clinker cement according to claim 7, wherein said additive is a hydrophobically modified hydroxy propylated guar (HMHPG).

* * * * *